(12) United States Patent
Willigan et al.

(10) Patent No.: US 10,214,823 B2
(45) Date of Patent: Feb. 26, 2019

(54) BIMETALLIC ZINCATING PROCESSING FOR ENHANCED ADHESION OF ALUMINUM ON ALUMINUM ALLOYS

(71) Applicant: United Technologies Corporation, Hartford, CT (US)

(72) Inventors: Rhonda R. Willigan, Manchester, CT (US); Lei Chen, South Windsor, CT (US); Mark R. Jaworowski, Glastonbury, CT (US)

(73) Assignee: United Technnologies Corporation, Farmington, CT (US)

( * ) Notice: Subject to any disclaimer, the term of this patent is extended or adjusted under 35 U.S.C. 154(b) by 0 days.

(21) Appl. No.: 14/775,016

(22) PCT Filed: Mar. 11, 2014

(86) PCT No.: PCT/US2014/023369
§ 371 (c)(1),
(2) Date: Sep. 11, 2015

(87) PCT Pub. No.: WO2014/150482
PCT Pub. Date: Sep. 25, 2014

(65) Prior Publication Data
US 2016/0024676 A1 Jan. 28, 2016

Related U.S. Application Data

(60) Provisional application No. 61/787,640, filed on Mar. 15, 2013.

(51) Int. Cl.
B32B 3/18 (2006.01)
C25D 3/44 (2006.01)
(Continued)

(52) U.S. Cl.
CPC .............. *C25D 3/44* (2013.01); *B32B 15/017* (2013.01); *C23C 18/1633* (2013.01);
(Continued)

(58) Field of Classification Search
None
See application file for complete search history.

(56) References Cited

U.S. PATENT DOCUMENTS 4,126,483 A 11/1978 Donakowski et al.
4,269,625 A 5/1981 Molenaar
(Continued)

OTHER PUBLICATIONS

"Melting, Boiling, Triple, and Critical Points of the Elements" in CRC Handbook of Chemistry and Physics, 97th Edition (Internet Version 2017), W. M. Haynes, ed., CRC Press/Taylor & Francis, Boca Raton, FL, pp. 4-116-4-118.*
(Continued)

*Primary Examiner* — Seth Dumbris
(74) *Attorney, Agent, or Firm* — Kinney & Lange, P.A.

(57) ABSTRACT

A coated metal component includes an aluminum alloy substrate and a protective aluminum coating on a substrate. An interfacial boundary layer between the coating and substrate enhances coating adhesion. The boundary layer includes isolated regions of copper or tin produced by a double zincating process. The protective aluminum coating exhibits improved adhesion and is formed by electrodeposition in an ionic liquid.

15 Claims, 3 Drawing Sheets

(51) Int. Cl.
    *C25D 3/66*     (2006.01)
    *C25D 5/44*     (2006.01)
    *C23C 18/16*     (2006.01)
    *C23C 18/54*     (2006.01)
    *C25F 3/00*     (2006.01)
    *C25F 5/00*     (2006.01)
    *B32B 15/01*     (2006.01)
    *C23C 18/31*     (2006.01)
    *C23F 1/00*     (2006.01)
    *C25F 3/02*     (2006.01)

(52) U.S. Cl.
    CPC .......... *C23C 18/1653* (2013.01); *C23C 18/31* (2013.01); *C23C 18/54* (2013.01); *C23F 1/00* (2013.01); *C25D 3/665* (2013.01); *C25D 5/44* (2013.01); *C25F 3/00* (2013.01); *C25F 3/02* (2013.01); *C25F 5/00* (2013.01); *Y10T 428/24917* (2015.01)

(56) References Cited

U.S. PATENT DOCUMENTS

| | | |
|---|---|---|
| 4,346,128 A | 8/1982 | Loch |
| 5,200,232 A * | 4/1993 | Tappan ............... C23C 16/4401 118/719 |
| 5,601,695 A | 2/1997 | Muranushi |
| 6,080,447 A | 6/2000 | Ferroni et al. |
| 2001/0040180 A1* | 11/2001 | Wittebrood .......... B23K 35/002 228/219 |
| 2002/0100694 A1 | 8/2002 | Morin et al. |
| 2004/0067314 A1 | 4/2004 | Joshi et al. |
| 2004/0086689 A1* | 5/2004 | Takahashi ................ C23C 4/02 428/141 |
| 2004/0173467 A1 | 9/2004 | Joshi et al. |
| 2005/0178669 A1 | 8/2005 | Strubbe |
| 2008/0241517 A1* | 10/2008 | Kenworthy ............. B32B 15/01 428/332 |
| 2014/0178710 A1* | 6/2014 | Chen ....................... C25D 5/10 428/610 |

OTHER PUBLICATIONS

Li, J. et al. "Complex Chemistry & the Electroless Copper Plating Process." Plating & Surface Finishing. Feb. 2004, 7 pages.
International Searching Authority, PCT Notification of Transmittal of the International Search Report and the Written Opinion, dated Aug. 12, 2014, 11 pages.
Partial European Search Report, for European Patent Application No. 14768546.5, dated Oct. 7, 2016, 9 pages.
Extended European Search Report, for European Patent Application No. 14768546.5, dated Feb. 16, 2017, 18 pages.

* cited by examiner

BIMETALLIC ZINCATING PROCESSING FOR ENHANCED ADHESION OF ALUMINUM ON ALUMINUM ALLOYS

BACKGROUND

The application relates generally to coating of metallic substrates and more specifically to the use of an interlayer to enhance electrodeposited aluminum coating adhesion on aluminum alloys.

Aluminum alloys in general, and high strength aluminum alloys in particular, are prone to localized corrosion. The presence of precipitates such as intermetallic particles is responsible for pitting corrosion susceptibility of these alloys. Additionally, secondary phases depositing in grain boundaries promote inter-granular corrosion, leading to exfoliation failure. The aluminum matrix of these alloys is chemically reactive and naturally forms an oxide film in the presence of water and air. The oxide is partially protective to the substrate, but offers little resistance to pitting corrosion that arises from the electrochemical potential difference between the matrix and the intermetallic phases. It is known that pure aluminum is significantly resistant to corrosion, in particular, localized corrosion such as pitting. Thus, coating aluminum alloy components with pure aluminum is an effective method to protect the aluminum alloy structures.

Electrodeposition of aluminum from aqueous solutions is not possible because the electronegativity of aluminum in relation to water is such that hydrogen will form in deference to aluminum deposition in a plating bath. The only commercialized aluminum electroplating technology in the U.S. is Alumiplate™, which employs a bath that is pyrophoric (triethylaluminum in solvent toluene) and operates above room temperature (at 100° C.). Such aluminum electroplating can be difficult and dangerous to implement due in part to the pyrophoric nature of the plating chemistry and use of organic solvents such as toluene. Toluene is currently listed by the U.S. Environmental Protection Agency (EPA) as a hazardous air pollutant (HAP).

Other advanced coatings processes have been developed but each has shortcomings. Thin film chemical vapor deposition (CVD), physical vapor deposition (PVD), and ion vapor deposition (IVD) cannot produce dense coatings. Dense coating is preferred as a corrosion protection barrier of the substrate. Recent advances in ionic liquids and related processes have shown promise for depositing dense aluminum coatings. Electroplating aluminum in room temperature ionic liquids has advantages of non-line-of-sight, green chemistry and being non-flammable compared with alternative technologies such as the Alumiplate process and IVD.

It is challenging to attain an adherent metallic coating on aluminum alloys via electroplating due to extremely rapid formation or re-formation of aluminum oxide. Specifically, aluminum alloys are chemically reactive with water and air, forming a native alumina film in ambient conditions. It is believed that removal of the oxide film is necessary for depositing adherent Al coatings. Due to the fast formation of aluminum oxide, it is common to deposit a thin zinc coating in an alkaline zincate solution prior to electroplating. The zinc immersion coating is deposited onto the aluminum alloys via the exchange reaction between Al and zincate ions. Powdery zinc deposit and inadequate surface coverage is common for such an immersion coating due to the nature of the reaction and the surface heterogeneity of Al alloys, therefore, double immersions with acid (HCl) etching in between immersions are a standard practice prior to electroplating. Partial dissolution of the zinc immersion coating occurs spontaneously in acidic plating baths and it allows a metallic coating to be partially deposited on aluminum substrates. The lack of acid in the ionic liquid plating bath makes the spontaneous dissolution of the zinc coating impossible, which can lead to adhesion and potentially corrosion issues. It is therefore desirable to remove the zinc coating in an ionic liquid solution by electrolytic etching prior to electroplating. It is also desirable to use an optimized interlayer composition and morphology to maximize deposition of aluminum onto the substrates with superior coating/substrate adhesion.

SUMMARY

A coated metal component includes an aluminum alloy substrate and a protective aluminum coating on the substrate. An inter-layer between the coating and substrate enhances coating adhesion. The interlayer includes isolated regions of copper or tin produced by a double zincating process. The protective aluminum coating exhibits improved adhesion and is formed by electrodeposition in an ionic liquid.

A method of applying a protective coating with improved adhesion on an aluminum alloy component includes first pretreating the surface of the component by removing the oxide coating and depositing a zinc protective layer using a zincating process. The zinc layer is then removed by etching and a zinc layer containing copper or tin is deposited using a bimetallic zincating process. The zinc can be optionally removed electrolytically in an ionic liquid and a protective aluminum coating with improved adhesion is deposited on the interface.

DETAILED DESCRIPTION

Figure 1A:
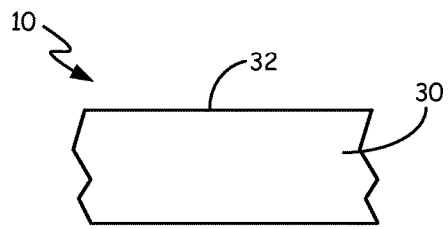
FIGS. 1A-1F schematically show a process of depositing an aluminum protective coating on aluminum alloys.

Pure aluminum coatings are used in the art to provide anticorrosion protection for high strength aluminum and other alloys. The high specific strength and fatigue resistance of these alloys play major roles in aircraft construction and in the cold sections of an aircraft engine. High strength Al alloys strengthened by the precipitation of secondary phases are susceptible to localized corrosion due to those secondary phases. It is therefore an industrial practice to clad a pure aluminum layer (ca. 5% of a sheet metal thickness) on Al alloys, i.e. "Alclad" Al alloys. The Al alloys are usually clad with aluminum mechanically by a pack rolling process, thus the method is only applicable to sheet form. As a result, "Alclad" cannot be used for the corrosion protection of components of complex geometry. Other forms of aluminum coating applications including CVD and PVD are useful but are difficult to scale up for components with large area or to apply dense protective aluminum coatings with the required thickness due to their slow deposition rates and to the porosity of the deposited coatings. These methods are also limited to line-of-sight applications. Electroplating has been used in the art to apply protective aluminum coatings to high strength aluminum alloy components of all shapes. However, aluminum is too active to be electrodeposited from aqueous solutions. As mentioned above, the only commercial aluminum electroplating technology in the U.S. is Alumiplate® which employs a pyrophoric bath containing triethylaluminum and toluene and operates above room temperature. The Alumiplate® plating chemistry is pyrophoric and the entire process, including substrate activation, needs to be performed in a closed inert environment. In addition, one of the solvents, toluene, is classified as a hazardous air pollutant.

An attractive process to electroplate aluminum on bulk aluminum alloy and other alloy components is, according to an embodiment of the present invention, electrodeposition from a room temperature ionic liquid. Advantages over prior art are non-line-of-sight deposition, pollution-free (green) chemistry, and a non-flammable process.

The interfacial compatibility and resulting adherence of a pure aluminum coating on, as an example, a high strength aluminum alloy, are sensitive to a number of factors. Aluminum alloys are chemically reactive with water and air and naturally form a dense protective oxide film subsequently. The oxide film can weaken the bonding of the coating due to interfacial structure mismatch or lack of metallurgical bonding. In addition, since high strength aluminum alloys are heat treated to achieve desired mechanical properties, the alloy microstructures will typically not match that of an electrodeposited pure aluminum coating. It is known in the art that interfacial properties critical to coating adhesion include microstructural match, interfacial chemical/atomic bonding and microstructural and mechanical interlock. An embodiment of the invention is to improve electrodeposited aluminum coating adhesion on high strength aluminum and other alloy substrates by forming an intermediate layer between the aluminum coating and substrate consisting of isolated "islands" or regions of at least one metal with an affinity to electroplated aluminum thereby aiding nucleation, growth, and improved coating adhesion.

It is known in the art, that the oxide film affects the adhesion of aluminum coatings deposited to protect aluminum alloys from corrosion and other surface degradation. An accepted pretreatment procedure for coating aluminum alloys with aluminum is to remove the oxide coating and deposit a protective metal layer such as zinc before the rapidly forming oxide has a chance to re-form.

Protective zinc and other metal coatings can be formed on aluminum alloys by an immersion coating process in which aluminum and other metal ions are chemically exchanged in solution. In the zincate process, the native oxide layer of aluminum is removed in an alkaline solution. The aluminum exposed thereby reacts with zincate ions in a zincate solution to form a protective zinc layer on the aluminum alloy substrate. A zincate solution is a highly alkaline solution of sodium hydroxide, zinc oxide, complexing agents, and possibly, other metal salts. Zinc deposition occurs according to the following redox reactions:

Dissolution of aluminum and formation of aluminate $$Al + 3OH^- \rightarrow Al(OH)_3 + 3e^-$$

$$Al(OH)_3 \rightarrow AlO_2^- + H_2O + H^+$$

Reduction of zincate and deposition on aluminum $$Zn(OH)_4^{2-} \rightarrow Zn^{2+} + 4OH^-$$

$$Zn^{2+} + 2e^- \rightarrow Zn$$

Other metals, if present in solution, may be co-deposited with the zinc.

Initial zinc deposition from a zincate solution may not provide adequate surface coverage typically due to the surface heterogeneity of aluminum alloys. Double immersions with acid (HCl) etching between immersions are, therefore, standard practice in the art prior to electroplating.

The invention is a double zincate process wherein the second immersion coating is carried out in a bimetallic zincate solution containing zinc and another metal with an affinity for electrodeposited aluminum. By adding a minor amount of a plating solution of another metal to the zincating solution, a bimetallic layer comprising a continuous layer of zinc containing isolated "islands" or regions of the metal dispersed in the zinc matrix layer can be deposited. The zinc matrix optionally can then be removed by electrolytic etching in an ionic liquid to produce a surface structure comprising an aluminum alloy surface containing dispersed "islands" or seeds of a metal or alloys with an affinity for electrodeposited aluminum. The electrodeposited protective aluminum coating on the inventive surface structure of the aluminum alloy may exhibit improved adhesion.

A number of factors need to be considered when selecting a second plating solution to be added to a zincate solution. First, the two solutions must be compatible in terms of pH. The two solutions should not chemically react with one another. The solutions should also not prevent each other from the elemental deposition of metal from each. Finally, the zinc matrix needs to be capable of electrochemical dissolution in an ionic liquid while the second metal "islands" remain unaffected.

Candidate metals for the bimetallic deposition of the invention can be determined from consideration of their electrochemical potentials with respect to zinc deposition in a zincate process. Since zincating solutions are typically alkaline, alkaline based candidate solutions are required. Copper is a candidate material for deposition from a zincate solution for the following reasons.

The electrochemical potential for converting metallic zinc to chlorozincate ions in the ionic liquid 1-ethyl-3-methyl imidazolium chloride-$AlCl_3$ ([EMIM]-$AlCl_3$), according to the ($Zn \rightarrow Zn^{2+} + 2e^-$) dissociation, is +0.32 volts vs. a $Al/Al^{3+}$ reference electrode. The electrochemical potential for converting metallic copper to copper ions according to the ($Cu \rightarrow Cu^{2+} + 2e^-$) dissociation, is +0.78 volts vs. a $Al/Al^{3+}$ reference electrode. The equilibrium potentials of these metals are separated from one other and Zn is more active than copper. As a result, using reverse potential etching in an ionic liquid after depositing a zinc plus copper bimetallic layer on an aluminum alloy from a bimetallic zincate solution of the invention, it is possible to selectively etch zinc from the aluminum alloy surface, leaving copper or another second metal behind. Assuming the amount of second metal plating solution added to the zincate solution is small, e.g., 10% or less by weight, the second metal deposition will be discontinuous and therefore "island like" in form. These islands may act as "seeds", promoting and improving the deposition and adhesion of aluminum from the ionic liquid plating bath.

In addition to copper, other metals such as tin may also serve as viable nucleation seeds. Preferably, the two elements deposit as distinct phases. Tin is known to exhibit low solubility in zinc and alkaline, electroless tin baths that work via disproportionation of $Sn^{+2}$ to $SnO$ and $Sn^{+4}$ exist. The electrochemical potential for converting metallic tin to tin ions, according to the ($Sn \rightarrow Sn^{2+}$ to $2e^-$) dissociation, is +0.55 volts vs. $Al/Al^{3+}$. So, while electrochemically closer to that of zinc than copper, it is still possible to selectively etch the zinc away, leaving behind tin "islands".

Figure 2:
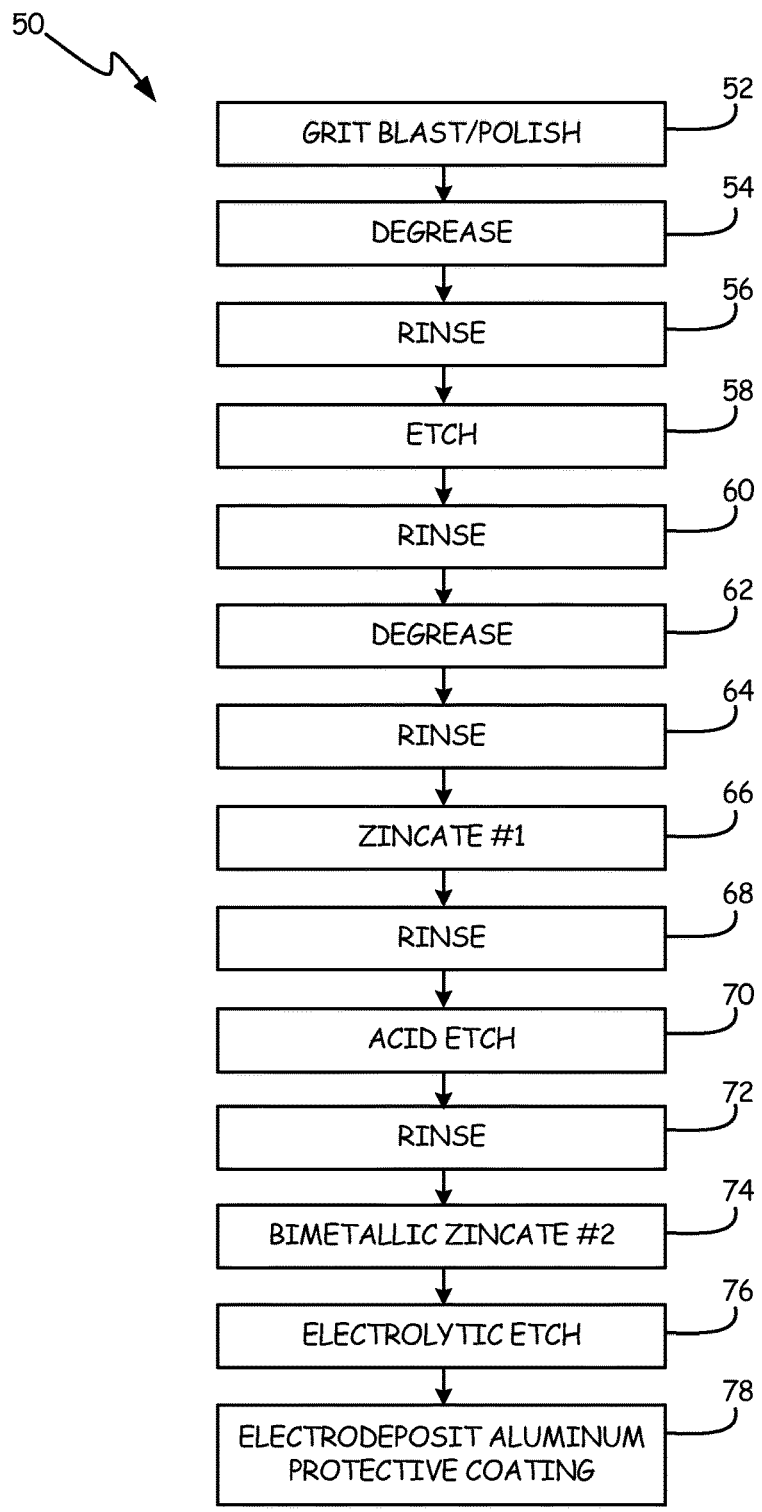
FIG. 2 is a flow chart of an example plating process of the invention.

Unprotected aluminum alloy component 10 is shown in FIG. 1A prior to application of an aluminum coating using a double zincating process of the invention. Component 10 comprises aluminum alloy substrate 30 and unprotected surface 32. A flow chart of double zincating embodiment 50 of the invention is shown in FIG. 2. In the process, surface 32 of component 10 is first subjected to a grit blast and polish to remove scale, flash, and other unwanted surface imperfections (Step 52). Component 10 is then subjected to a degrease operation in a mildly alkaline aqueous solution to remove oil and other residue (Step 54), followed by a rinse (Step 56). Surface 32 is then etched in a strong alkaline solution to remove surface oxides (Step 58). A highly alkaline solution with pH>13 at temperatures of 50-60° C. may be suitable for this step. The component is then rinsed (Step 60).

Alkaline etch treatments leave intermetallic particles and other insoluble oxides on aluminum alloy surface 32 that form a discolored coating termed "smut" in the art. Removal or "desmutting" is usually carried out in an acid solution at 15-30° C. and results in a clean surface (Step 62). Component 10 is then rinsed (Step 64).

Figure 1B:
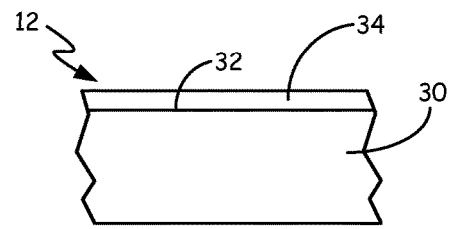

In the first zincating process, surface 32 is immersed in a zincate solution for a few minutes at room temperature (Step 66). Sacrificial zinc layer 34 deposits on surface 32 to form zincated component 12 as shown in FIG. 1B. The thickness of zinc layer 34 may be between about 0.02 microns and about 5 microns.

A rinsing step follows the first zincating process (Step 68).

Figure 1C:
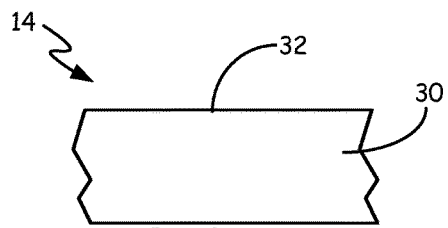
Figure 1D:
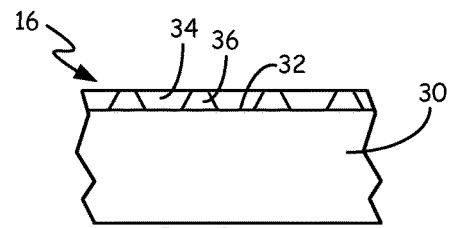

To prepare for the bimetallic zincating process of the invention, sacrificial zinc layer 32 is removed by etching (Step 70) and rinsing (Step 72) to form component 14 as shown in FIG. 1C. In the bimetallic zincating process of the invention (Step 74), surface 32 is exposed to a zincating solution containing a minor amount, preferably less than 10 wt. % of a copper or tin electroless plating solution at about 50° C. for about 0.5-10 minutes. In this process, continuous zinc layer 34 containing isolated "islands" or seeds 36 of copper or tin deposits on surface 32 to form component 16 as shown in FIG. 1D.

Figure 1E:
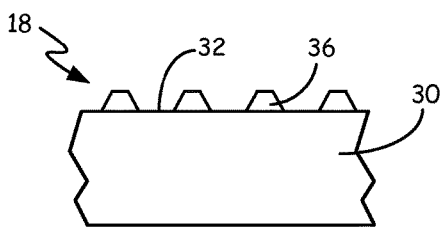
Figure 1F:
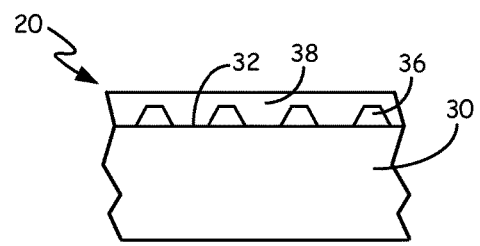

In an embodiment of the invention, zinc layer 34 is electrolytically removed in an ionic liquid to form component 18 as shown in FIG. 1E (Step 76). Surface 32 of aluminum alloy component 18 contains copper or tin "islands" or seeds 36 dispersed over surface 32 that may act as nucleating sites to improve growth and adhesion of electrodeposited aluminum coating 38. As shown in FIG. 1F, aluminum protective coating 38 is electrodeposited on surface 32 and seeds 36 in an ionic liquid to form coated aluminum alloy component 20 (Step 78). As noted, the presence of seeds 36 on surface 32 may increase the growth and adhesion of aluminum protective coating 38 on aluminum alloy component 20.

Figure 3:
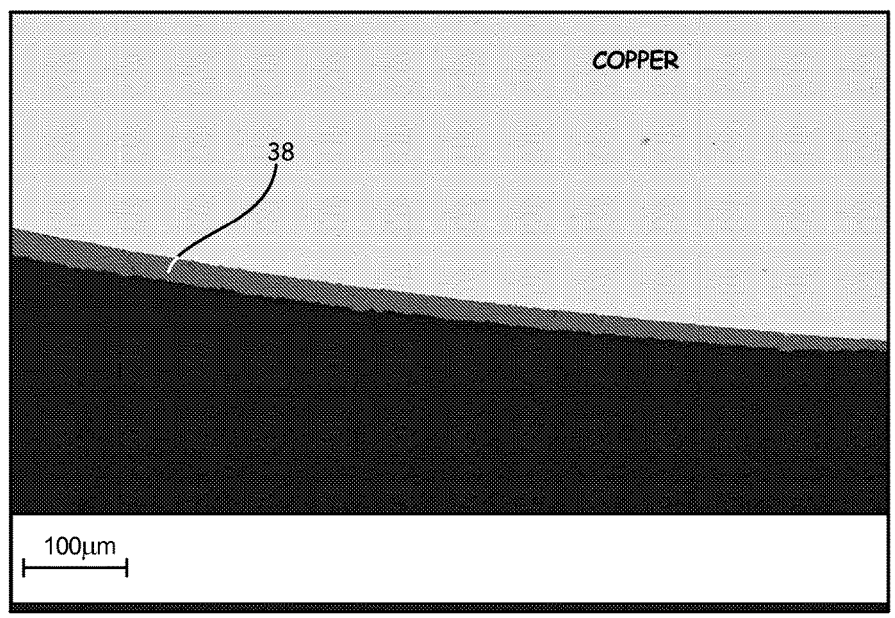
FIG. 3 is a photomicrograph of an electrodeposited aluminum coating on copper.

An indication of the suitability of using copper seeds to enhance growth and adhesion of aluminum coatings electrodeposited on aluminum alloy substrates in ionic liquids is shown in FIG. 3. FIG. 3 shows a micrograph of a cross section of aluminum coating 38 electrodeposited on a copper substrate in an EMIM-AlCl$_3$ ionic liquid. The interfacial integrity is clearly apparent.

DISCUSSION OF POSSIBLE EMBODIMENTS

The following are non-exclusive descriptions of possible embodiments of the present invention.

A coated metal component may include: an aluminum alloy substrate; an intermediate layer on the substrate comprising isolated islands of a first metal deposited on the aluminum alloy substrate, wherein the first metal is capable of electroless codepositing with zinc; and an electrodeposited aluminum protective coating on the intermediate layer and aluminum alloy substrate.

The component of the preceding paragraph can optionally include, additionally, and/or alternatively, any, one or more of the following features, configurations, and/or additional components:

The intermediate layer may be deposited using a double zincating and etch process.

The double zincating and etch process may include: depositing a sacrificial zinc layer in a first zincating process; acid etching to partially remove the zinc; depositing a bimetallic layer comprising isolated islands of a first metal in a continuous zinc matrix using a second bimetallic zincating process; and electrolytic etching to remove the zinc to form the intermediate layer.

The electrolytic etching may be in an ionic liquid.

The first metal may be selected from the group consisting of copper and tin;

The second bimetallic zincate process solution may include a bimetallic plating solution containing a zincating solution and a minor amount of about 10 wt. % or less of a first metal immersion coating solution.

The first metal immersion coating solution may be selected from the group consisting of Cu, Sn, Ce, and Zr.

The electrodeposited aluminum protective coating may be substantially pure aluminum.

A method of applying a protective aluminum coating with improved adhesion on an aluminum alloy substrate may include: depositing an intermediate layer comprising isolated islands of a first metal in a continuous zinc matrix on the aluminum alloy substrate, wherein the first metal is capable of electroless codeposition with zinc; and electrodepositing an aluminum protective coating on the intermediate layer and aluminum alloy substrate.

The method of the preceding paragraph can optionally include, additionally, and/or alternatively, any, one or more of the following features, configurations, and/or additional components:

The electrolytic etching may be carried out in an ionic liquid.

The electrodeposition may be carried out in an ionic liquid.

The bimetallic plating solution may include a zincating solution and an amount of about 10 wt. % or less of a first metal electroless plating solution.

The first metal may be selected from the group consisting of copper and tin.

The first electroless plating solution may be selected from the group consisting of copper and tin electroless plating solutions.

The aluminum protective coating may be substantially pure aluminum.

While the invention has been described with reference to an exemplary embodiment(s), it will be understood by those skilled in the art that various changes may be made and equivalents may be substituted for elements thereof without departing from the scope of the invention. For instance, the second bi-metallic immersion coating process can be repeated more than once with acid etching in between the immersion coating steps to optimize the properties of the resultant coating. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A coated metal component comprising:
an aluminum alloy substrate having a surface;
an intermediate layer on the substrate comprising isolated islands of a first metal deposited on the aluminum alloy substrate, wherein the first metal is capable of electroless co-depositing with zinc; and
an electrodeposited protective coating consisting of pure aluminum on the intermediate layer and aluminum alloy substrate, the protective coating having a continuous outer surface opposite the aluminum alloy substrate;
wherein the protective coating is in contact with the isolated islands of the intermediate layer and the surface of the aluminum alloy substrate.

2. The component of claim 1, wherein the intermediate layer is deposited using a double zincating and etch process.

3. The component of claim 2, wherein the double zincating and etch process comprises:
depositing a sacrificial zinc layer in a first zincating process;
acid etching to partially remove the zinc;
depositing a bimetallic layer comprising isolated islands of the first metal in a continuous zinc matrix using a second bimetallic zincating process; and
electrolytic etching to remove the zinc to form the intermediate layer.

4. The component of claim 3, wherein the electrolytic etching is in an ionic liquid.

5. The component of claim 3, wherein the first metal is selected from the group consisting of copper and tin.

6. The component of claim 3, wherein the second bimetallic zincate process solution comprises a bimetallic plating solution containing a zincating solution and a minor amount of about 10 wt. % or less of a first metal immersion coating solution.

7. The component of claim 6, wherein the first metal immersion coating solution is selected from the group consisting of Cu, Sn, Ce, and Zr.

8. A method of applying a protective aluminum coating on an aluminum alloy substrate, the method comprising:
depositing an intermediate layer comprising isolated islands of a first metal in a continuous zinc matrix on a surface of the aluminum alloy substrate, wherein the first metal is capable of electroless codeposition with zinc; and
electrodepositing a protective coating consisting of pure aluminum on the intermediate layer and aluminum alloy substrate, the protective coating having a continuous outer surface opposite the aluminum alloy substrate, such that the protective coating is in contact with the isolated islands of the intermediate layer and the surface of the aluminum alloy substrate.

9. The method of claim 8, wherein the intermediate layer is deposited using a double zincating process.

10. The method of claim 9, wherein the double zincating process comprises:
depositing a sacrificial zinc layer on the aluminum alloy using a first zincating process comprising grit blasting/polishing, acid etching, desmutting, electroless zinc deposition, rinsing, drying, and combinations thereof;
etching to remove the zinc layer;
depositing a bimetallic layer comprising isolated islands of a first metal in a continuous zinc matrix using a second zincating process comprising electroless deposition of zinc and the first metal from a bimetallic plating solution; and
removing the zinc by electrolytic etching to form the intermediate layer.

11. The method of claim 10, wherein the electrolytic etching is carried out in an ionic liquid.

12. The method of claim 8, wherein the electrodeposition is carried out in an ionic liquid.

13. The method of claim 10, wherein the bimetallic plating solution comprises a zincating solution and an amount of about 10 wt. % or less of a first metal electroless plating solution.

14. The method of claim 8, wherein the first metal is selected from the group consisting of copper and tin.

15. The method of claim 13, wherein the first metal electroless plating solution is selected from the group consisting of copper and tin electroless plating solutions.

* * * * *